(12) United States Patent
Sterman

(10) Patent No.: US 8,817,961 B1
(45) Date of Patent: Aug. 26, 2014

(54) METHOD AND APPARATUS FOR PROVIDING TRUSTED CALLER ID SERVICES

(71) Applicant: Vonage Network LLC, Holmdel, NJ (US)

(72) Inventor: Baruch Sterman, Efrat (IL)

(73) Assignee: Vonage Network LLC, Holmdel, NJ (US)

( * ) Notice: Subject to any disclaimer, the term of this patent is extended or adjusted under 35 U.S.C. 154(b) by 0 days.

(21) Appl. No.: 13/771,711

(22) Filed: Feb. 20, 2013

(51) Int. Cl.
*H04M 1/56* (2006.01)
*H04M 15/06* (2006.01)
*H04M 3/42* (2006.01)

(52) U.S. Cl.
USPC ................................. 379/142.05; 379/207.14

(58) Field of Classification Search
USPC ............. 379/142.01, 142.05, 142.06, 207.13, 379/207.14
See application file for complete search history.

(56) References Cited

U.S. PATENT DOCUMENTS

| | | | |
|---|---|---|---|
| 6,324,271 B1 * | 11/2001 | Sawyer et al. ........... | 379/142.05 |
| 6,771,755 B1 | 8/2004 | Simpson | |
| 7,443,964 B2 | 10/2008 | Urban et al. | |
| 8,135,119 B1 * | 3/2012 | Zhao et al. ............... | 379/142.05 |
| 8,290,130 B2 * | 10/2012 | Cheon et al. ............. | 379/142.05 |
| 2007/0036136 A1 * | 2/2007 | Barclay et al. ................ | 370/352 |
| 2008/0181379 A1 * | 7/2008 | Chow et al. .............. | 379/142.05 |
| 2008/0187119 A1 * | 8/2008 | Vinokurov et al. ...... | 379/142.05 |
| 2009/0046839 A1 * | 2/2009 | Chow et al. .............. | 379/142.01 |
| 2009/0310766 A1 * | 12/2009 | Ye ............................. | 379/142.17 |
| 2010/0135477 A1 | 6/2010 | Chen | |
| 2011/0211572 A1 * | 9/2011 | Campion et al. .............. | 370/352 |
| 2012/0219128 A1 | 8/2012 | Farah et al. | |
| 2012/0287823 A1 * | 11/2012 | Lin ............................... | 370/259 |

OTHER PUBLICATIONS

PCT Search Report and Written Opinion, PCT/US2014/016682, received on May 28, 2014, 13 pages.

* cited by examiner

*Primary Examiner* — Quoc D Tran
(74) *Attorney, Agent, or Firm* — Moser Taboada; Joseph Pagnotta

(57) ABSTRACT

Methods and apparatus for providing trusted caller identification services between a first entity and a second entity are provided herein. In some embodiments, a method for validating an identity of a first entity to the second entity may include registering the first entity with a trust authority, wherein registering the first entity includes authenticating the identity of the first entity, and associating the unique code with a caller ID name (CNAM) of the first entity, receiving an identifier in association with a call request, determining that the identifier is correlated with the unique code, and providing to the second entity the CNAM together with an indication of validity.

19 Claims, 7 Drawing Sheets

METHOD AND APPARATUS FOR PROVIDING TRUSTED CALLER ID SERVICES

BACKGROUND OF THE INVENTION

1. Field of the Invention

Embodiments of the present invention generally relate to telecommunication systems and, more particularly, to a method and apparatus for providing verification of the identification of a first entity to a second entity.

2. Description of the Related Art

Voice over IP (VoIP) is a technological development in the field of telecommunications that is utilized to transmit voice conversations over a data network using the Internet Protocol (IP). After a user subscribes to a VoIP service, the user can make/receive phone calls to/from other VoIP subscribers or to public switched telephone network (PSTN) customers and access a number of features associated with the VoIP service, such as call waiting, three-way calling, call forwarding, voicemail service, and the like.

Calls from a VoIP caller typically display the caller ID information of the caller to the called party. The inventor has observed that it is very easy for a VoIP caller to "spoof" his/her caller ID to appear as someone they are not. Caller ID information is often centrally maintained on the Public Switched Telephone Network (PSTN) in a Caller Name (CNAM) database. Generally, service providers access the CNAM database to retrieve caller ID data. However, the CNAM request for information is based on the calling number that is provided by the caller and, in the case of a VoIP call, that number is freely editable by the caller without any verification. This prevents called parties from screening calls from unknown or undesirable callers (such as telemarketers).

Accordingly, there exists a need in the art for a method and apparatus for providing improved caller ID information in a telecommunication system that can recognize when a caller ID is legitimate and conveying that information to the called party.

SUMMARY OF THE INVENTION

Methods and apparatus for validating an identity of a first entity to a second entity are provided herein. In some embodiments, a method for validating an identity of a first entity to a second entity may include registering the first entity with a trust authority, wherein registering the first entity includes authenticating the identity of the first entity, and associating a unique code with a caller ID name (CNAM) of the first entity, receiving an identifier in association with a call request, determining that the identifier is correlated with the unique code, and providing to the second entity the CNAM together with an indication of validity.

In some embodiments, a method of validating an identity of a first entity to a second entity may include registering the second entity in a database maintained by the first entity, wherein registering includes associating a personal code in the secure database with one or more of the second entity's contact numbers, receiving a call from the second entity, retrieving, from the database, the second entity's personal code, after the call is established, providing a verification message including the second entity's personal code to verify that the second entity called the first entity.

In some embodiments, a method of validating an identity of a first entity to a second entity may include registering the second entity in a database maintained by the first entity, wherein registering includes associating a personal code in the secure database with one or more of the second entity's contact numbers, retrieving, from the database, the second entity's personal code, calling the second entity, and after the call is established, providing a verification message including the second entity's personal code to verify the identity of the first entity.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
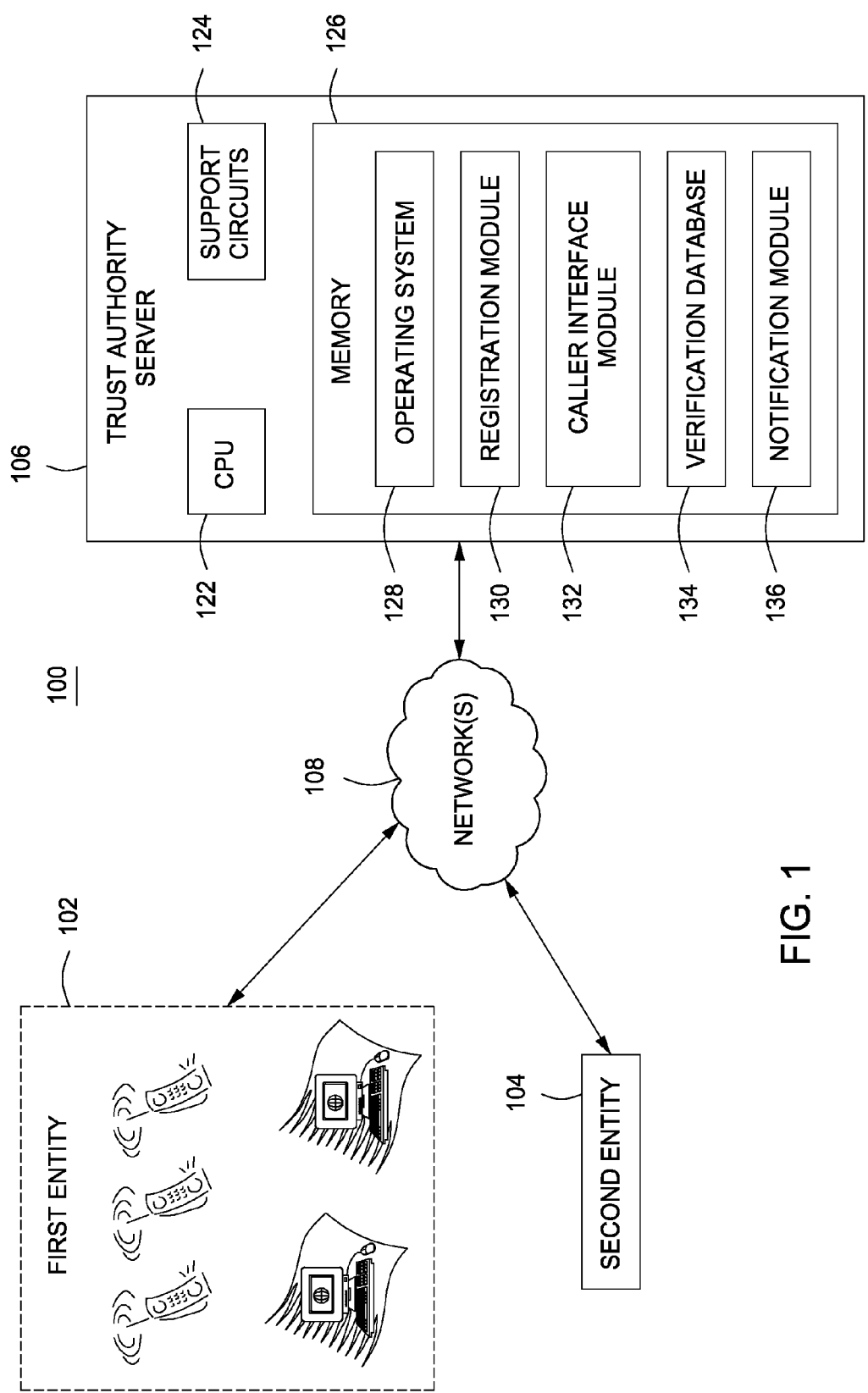
FIG. 1 depicts a block diagram of a system for validating an identity of a first entity to a second entity, according to one or more embodiments.

While the method and apparatus for providing verification of the identification of a first entity to a second entity is described herein by way of example for several embodiments and illustrative drawings, those skilled in the art will recognize that method and apparatus for providing support for an Internet-based service is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of method and apparatus for providing verification of the identification of a first entity to a second entity as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Embodiments of the present invention comprise methods and apparatus for validating an identity of a first entity to a second entity. Embodiments of the present invention advantageously improve upon the Caller ID feature, particularly with respect to Voice over Internet Protocol (VoIP) service providers. Specifically, due to the nature of VoIP, it is easy to spoof the Caller ID (based on the FROM field of a SIP header). Embodiments of the present invention include validation methods and apparatus that will notify a VoIP subscriber that the calling party is a trusted entity. Those skilled in the art will appreciate that embodiments of the present invention can also be used with non-VoIP telephony providers and subscribers. Embodiments of the present invention are described below with respect to FIGS. 1-5.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 depicts a block diagram of a system 100 for validating an identity of a first entity to a second entity, according to one or more embodiments. The system 100 comprises a first entity 102, a second entity 104, and a trust authority server 106, communicatively coupled to each of the first entity 102 and second entity 104 via one or more networks 108. The first entity 102 may be a business entity that includes a plurality of telephony devices, computers, and video conferencing devices associated with the business entity, or operating on behalf of the business entity. In some embodiments, the trust authority server 106 is maintained by a telephony service provider (e.g., such as a VoIP service provider). In some embodiments, the trust authority server 106 may be maintained, or otherwise associated with, the first entity 102. The second entity as used here may be a standard telephony service subscriber, such as an individual user accessing telephony service via a mobile device, a computer, a TV, etc.

The network 108 may be one or more networks such as an Internet Protocol (IP) network or a public switched telephone network (PSTN) used to connect the first entity 102, the second entity 104 and/or the trust authority 106 together.

The trust authority 106 comprises a CPU 122, support circuits 124, and a memory 126. The CPU 122 may comprise one or more commercially available microprocessors or microcontrollers that facilitate data processing and storage. The various support circuits 124 facilitate the operation of the CPU 122 and include one or more clock circuits, power supplies, cache, input/output circuits, displays, and the like. The memory 126 includes at least one of Read Only Memory (ROM), Random Access Memory (RAM), disk drive storage, optical storage, removable storage and/or the like. In some embodiments, the memory 126 may include an operating system 128, a registration module 130, a caller interface module 132, a verification database 134, and a notification module 136.

The operating system 128 generally manages various computer resources (e.g., network resources, file processors, and/or the like). The operating system 128 is configured to execute operations on one or more hardware and/or software modules, such as Network Interface Cards (NICs), hard disks, virtualization layers, firewalls and/or the like. Examples of the operating system 128 may include, but are not limited to, Linux, Mac OSX, BSD, Unix, Microsoft Windows, and the like.

The registration module 130 is used to register the first entity with the trust authority as a trusted entity, and to provide the first entity with a unique code that identifies callers/devices associated with the first entity as trusted entities. The operation of the registration module 130 is discussed below with respect to FIGS. 2 and 3 in more detail. In some embodiments, the caller interface module 132 may be used to accept the unique code from the first entity 102 when the first entity 102 attempts to establish a call to the second entity 104. In some embodiments, the caller interface module 132 may be an Interactive voice response (IVR) system to accept the unique code from the first entity 102. The accepted unique code may then be used as a lookup key to verification DB 134 to determine if the first entity 102 is stored in the verification DB 134 as a trusted entity. Once the first entity 102 is validated as a trusted entity, the trust authority 106 notifies the second entity 104 (i.e., the called party) using notification module 136 that the calling party (i.e., the first entity) has been validated and is a trusted entity. The notification module may notify the second entity that the first entity is a trusted entity by (1) augmenting the caller ID name (CNAM) with a reserve character (such as a "*" symbol or other type of character(s)) indicating a validated identity of the first entity, (2) signaling the device associated with the second entity to play a reserved audio tone, (3) sending a message to the second entity using another communication means, (4) using an interactive voice response (IVR) system to play a message, or (5) causing the device associated with the second entity to play a special ring tone.

Figure 2:
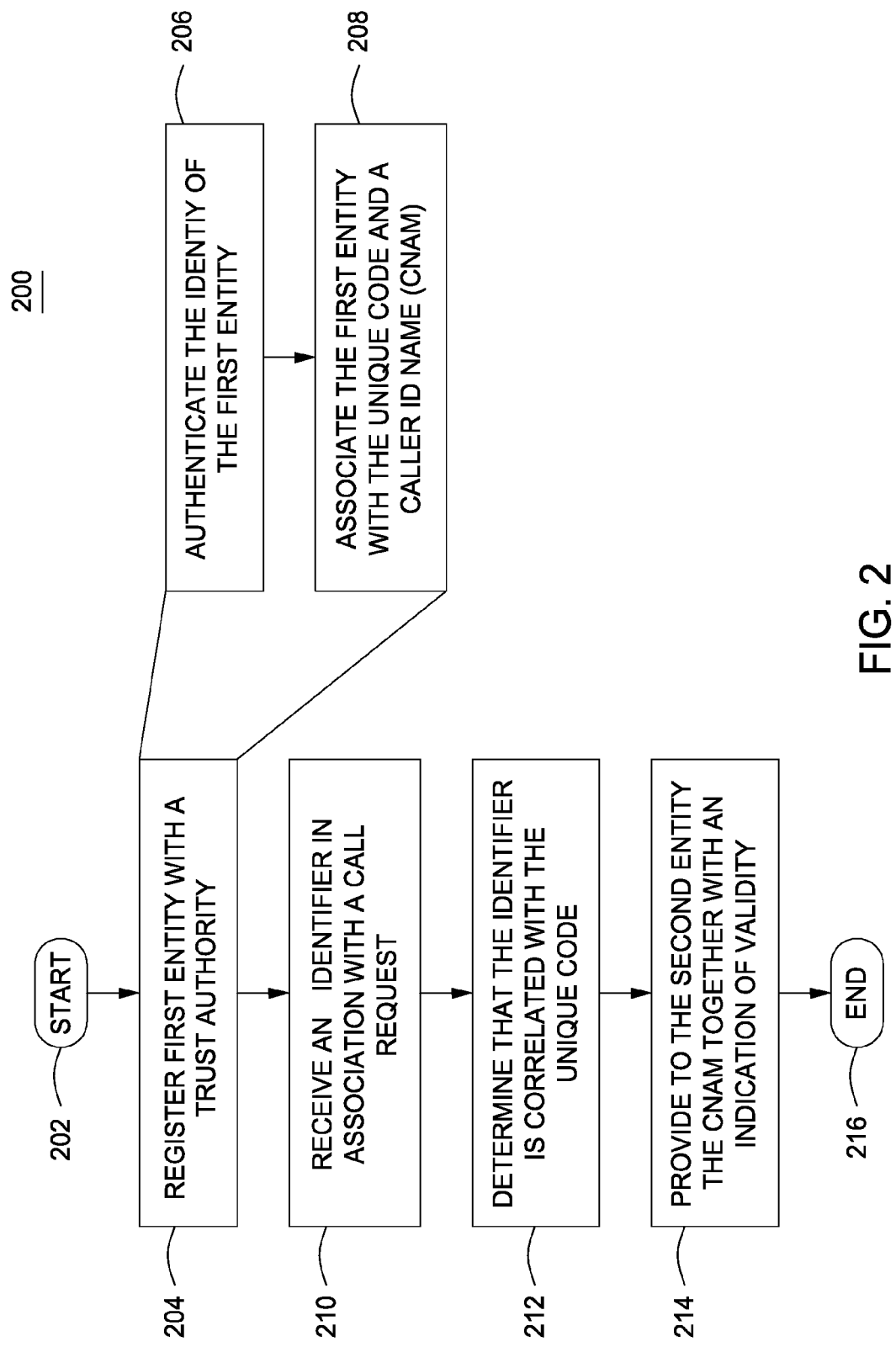
FIG. 2 depicts a flow diagram of a method for validating an identity of a first entity to a second entity, according to one or more embodiments.

FIG. 2 depicts a flow diagram of a method 200 for validating an identity of a first entity to a second entity. The method 200 starts at 202 and proceeds to 204. At 204, the first entity 102 registers with a trust authority 106, for example, using registration module 130. In some embodiments, the act of the first entity 102 registering with the trust authority 106 may include authenticating the identity of the first entity (206). For example, in some exemplary embodiments, a first entity (such as a bank, an insurance company, individual, etc.) may want to register its identity with the trust authority. The first entity's identity may be manually or automatically verified through any conventional ways available. For example, the first entity may contact the trust authority and the trust authority may request certain information to verify the identity of the business entity.

Once the first entity's identity is authenticated, at 208 the trust authority may associate the first entity with the unique code and a caller ID name (CNAM). For example, the trust authority may supply the first entity with a unique code for identifying the first entity as the trusted entity, or the first entity may select/create a unique code. Since a phone number and other types of device specific information may be spoofed, in some embodiments consistent with the present invention the unique code is not a phone number, a CNAM, a network connection identifier, or device specific information associated with the first entity. In some embodiments, the unique code may be a username and/or password provided to the first entity. In some embodiments, a certificate may be supplied to the first entity that includes unique indentifying information. When the first entity attempts to call another party, the first entity would first verify their identity using the supplied certificate or information from the certificate. The unique code and a caller ID name (CNAM), as well as other information associated with the first entity, may be stored in a verification database maintained by the trust authority. The verification database may be indexed by the unique code, which is used as a lookup key to determine if the calling party is a trusted entity.

After the registration process is complete, the method 200 proceeds to 212 where a call request from a device associated with the first entity to establish a call with a second entity (i.e., the called party) is received and processed by the caller interface 134 of the trust authority 106. An identifier may be received in association with the call request that identifies the first entity to the trust authority. At 212, the trust authority determines that the identifier is correlated with the unique code associated with the first entity. In some embodiments, the unique code can be derived from the identifier. In other embodiments, the identifier is the same as the unique code. In some embodiments, the first entity's contact number may also be used to lookup the first entity's CNAM to further verify the identity of the first entity.

After the identifier is correlated with the unique code associated with the first entity, at 214 the trust authority may provide to the second entity the CNAM of the first entity together with an indication of validity of the identity of the first entity. Providing the second entity an indication of validity of the identity of the first entity may include (1) augmenting the caller ID name (CNAM) with a reserve character indicating a validated identity of the first entity, (2) signaling the device associated with the second entity to play a reserved audio tone, (3) sending a message to the second entity using another communication means, (4) using an interactive voice response (IVR) system to play a message, or (5) causing the device associated with the second to play a special ring tone. For example, the CNAM may be modified to include one or more reserve characters (such as the "*" character) that would indicate to the second entity that the calling party has been verify by a trusted third party. In some embodiments, a picture or graphic of a certification/validation symbol may be displayed on the display of the second entity device that would indicate to the second entity that the calling party has been verify by a trusted third party. The method 200 ends at 216.

Figure 3A:
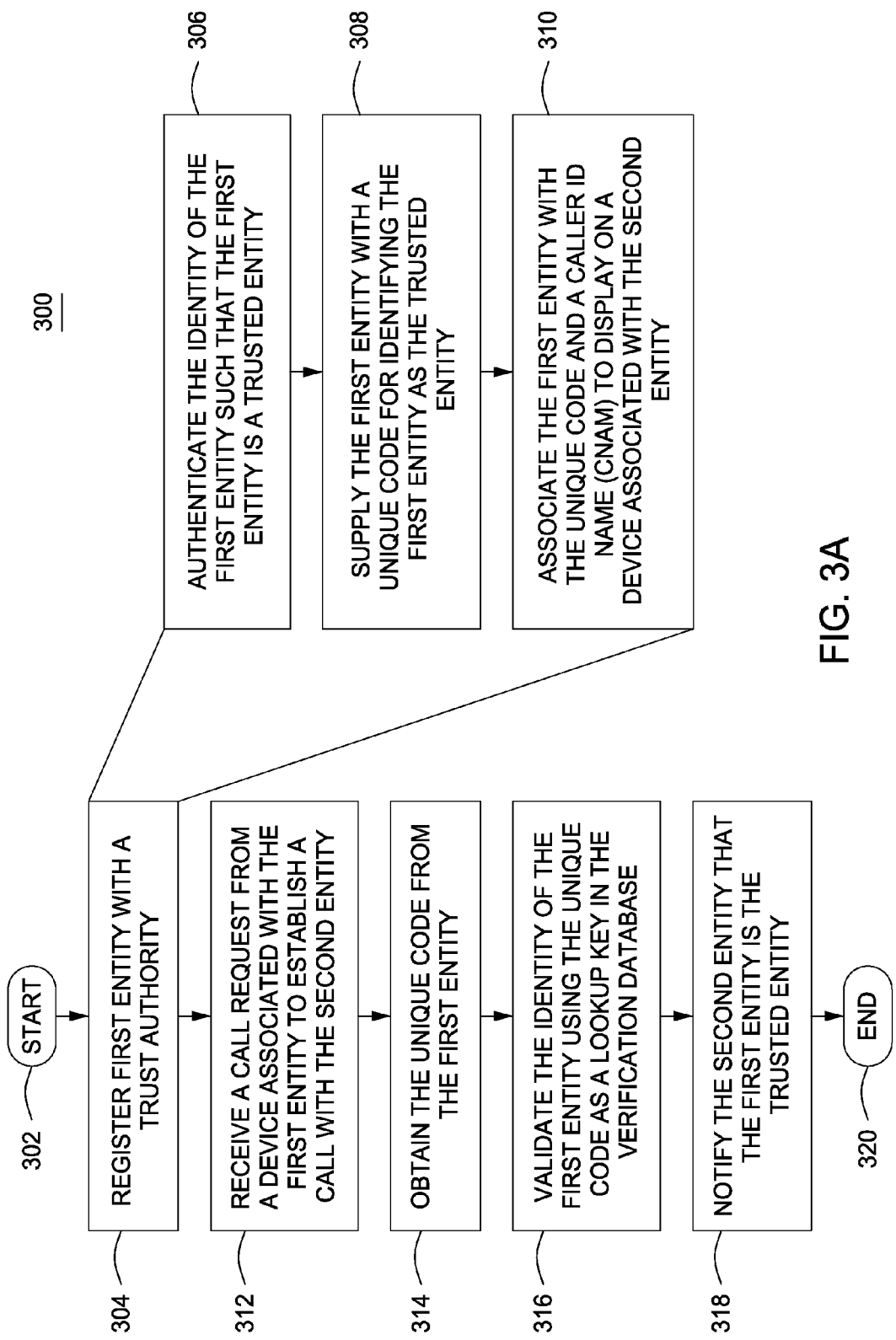
FIG. 3A depicts a flow diagram of a method for validating an identity of a first entity to a second entity, according to one or more embodiments.

FIG. 3A depicts a flow diagram of a method 300 for validating an identity of a first entity to a second entity. The method 300 starts at 302 and proceeds to 304. At 304, the first entity 102 registers with a trust authority 106, for example, using registration module 130. In some embodiments, the act of the first entity 102 registering with the trust authority 106 may include authenticating the identity of the first entity such that the first entity is a trusted entity (306). For example, in some exemplary embodiments, a first entity (such as a bank, an insurance company, individual, etc.) may want to register its identity with the trust authority. The first entity's identity may be manually or automatically verified through any conventional ways available. For example, the first entity may contact the trust authority and the trust authority may request certain information to verify the identity of the business entity.

Once the first entity's identity is authenticated, at 308 the trust authority may supply the first entity with a unique code for identifying the first entity as the trusted entity. Since a phone number and other types of device specific information may be spoofed, in embodiments consistent with the present invention the unique code is different from a phone number or other device specific information associated with the third party. In some embodiments, the unique code may be a username and/or password provided to the first entity. In some embodiments, a certificate may be supplied to the first entity that includes unique indentifying information. When the caller attempts to call another party, the caller would first verify their identity using the supplied certificate or information from the certificate. The registration process 304 finishes at 310, where the first entity is associated with the unique code and a caller ID name (CNAM) to display on a device associated with the second entity in the verification database maintained by the trust authority. The verification database may be indexed by the unique code, which is used as a lookup key to determine if the calling party is a trusted entity.

After the registration process is complete, the method 300 proceeds to 312 where a call request from a device associated with the first entity to establish a call with a second entity (i.e., the called party) is received and processed by the caller interface 134 of the trust authority 106. The trust authority obtains the unique code from the first entity at 314. In some embodiments, the trust authority prompts the first entity for the unique code to obtain the unique code from the first entity to validate the identity of the first entity. In other embodiments, the unique code is included within the call request from the first entity. For example, in some embodiments, the unique code is included in a certificate supplied to the first entity by the trust authority. The certificate may be stored on one or more devices associated with the first entity.

After the unique code is obtained, the identity of the first entity is validated using the unique code as a lookup key in the verification database at 316. In some embodiments, any person associated with the first entity that possesses the unique code for the first entity, may initiate a call request to the second entity and input the unique code which validates them as a trusted entity (e.g. from a payphone or other public device in addition to private devices associated with the first entity).

Once the calling party is validated in the verification database, the second entity is notified that the first entity is a trusted entity at 318. Notifying the second entity that the first entity is the trusted entity may include (1) augmenting the caller ID name (CNAM) with a reserve character indicating a validated identity of the first entity, (2) signaling the device associated with the second entity to play a reserved audio tone, (3) sending a message to the second entity using another communication means, (4) using an interactive voice response (IVR) system to play a message, or (5) causing the device associated with the second to play a special ring tone. For example, the CNAM may be modified to include one or more reserve characters (such as the "*" character) that would indicate to the second entity that the calling party has been verify by a trusted third party. In some embodiments, a picture or graphic of a certification/validation symbol may be displayed on the display of the second entity device that would indicate to the second entity that the calling party has been verify by a trusted third party. The method 300 ends at 320.

In some embodiments, call requests may be received from untrusted entities (e.g., entities not registered with the trusted authority or those that provided invalid unique codes). The second entity would be notified by the trusted authority that the calling party is untrusted. For example, the lack of a special reserved character (e.g., the "*" character) appended to the CNAM, or a voice/SMS message indicating the caller has not been verified would alert the second entity.

Figure 3B:
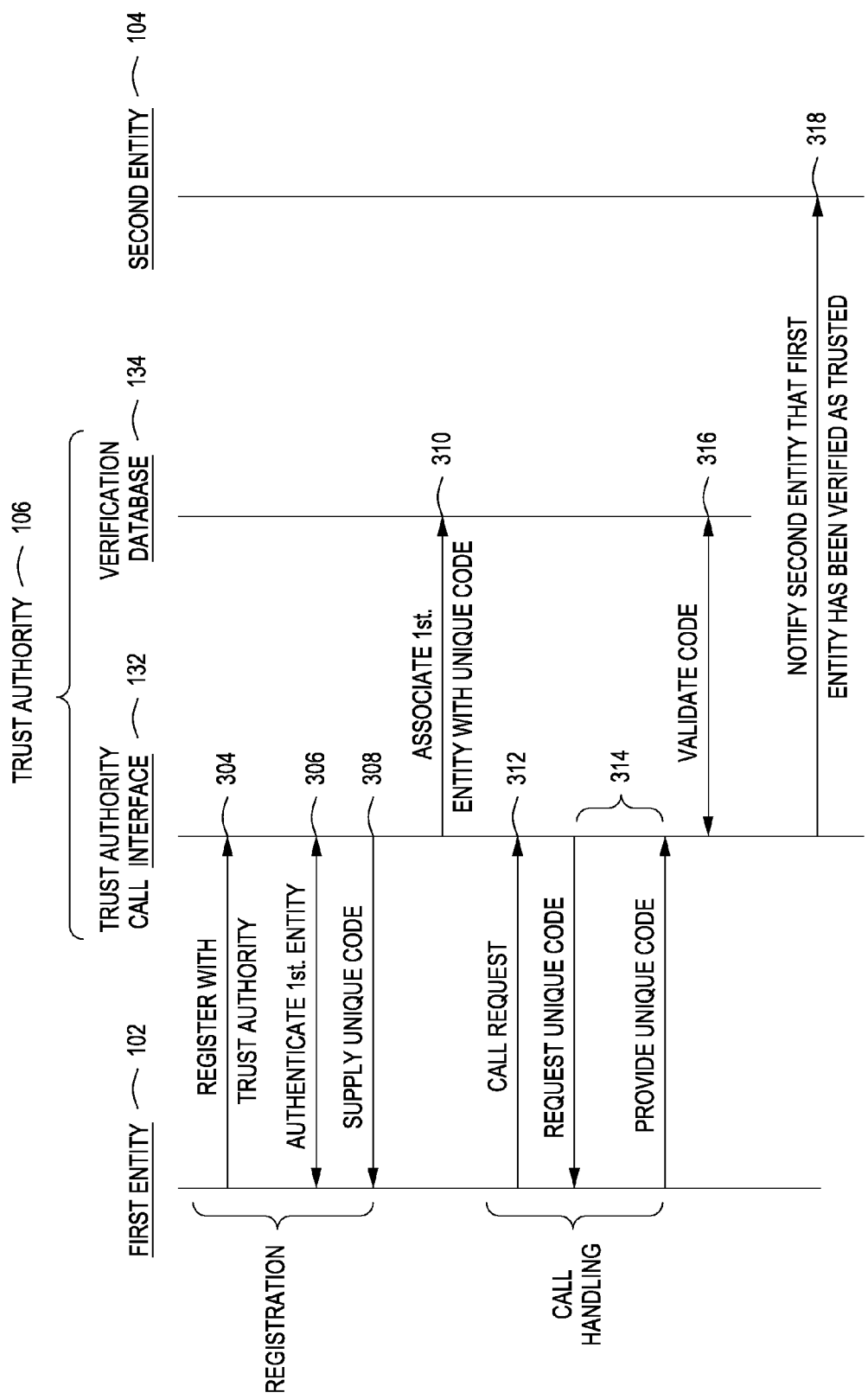
FIG. 3B depicts a signaling diagram associated with the method of FIG. 3A for validating an identity of a first entity to a second entity, according to one or more embodiments.

FIG. 3B depicts a signaling diagram associated with the method 300 of FIG. 3A for validating an identity of a first entity to a second entity, according to one or more embodiments. Specifically, FIG. 3B shows a first entity 102 initially registering with the trust authority 106 via call interface 132. Reference numbers in FIG. 3B correspond to elements described in FIGS. 1 and 3A above.

Figure 4A:
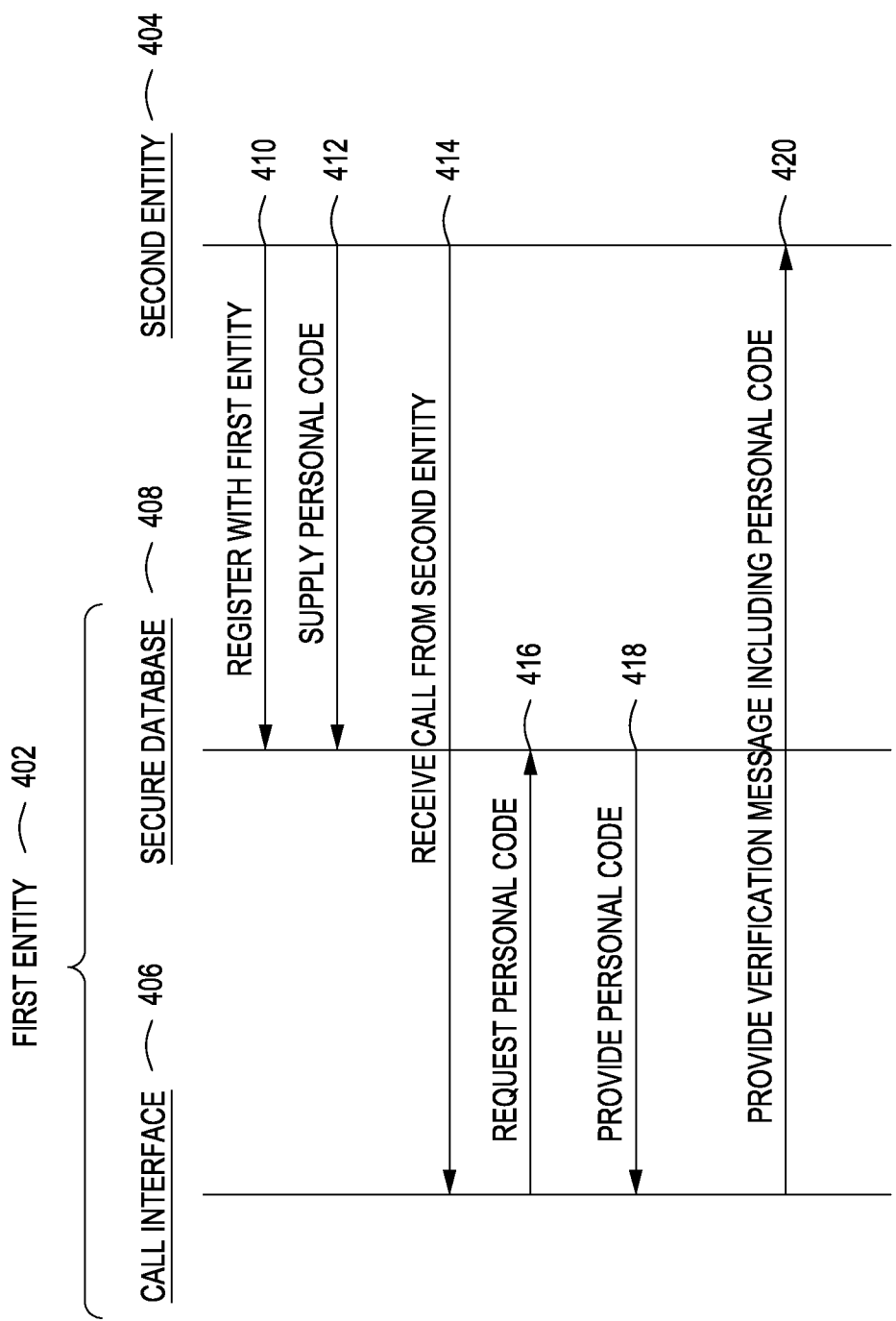
FIG. 4A depicts a signaling diagram of a method of validating an identity of a first entity to a second entity for an outbound call without the use of a third party trusted authority, according to one or more embodiments.
Figure 4B:
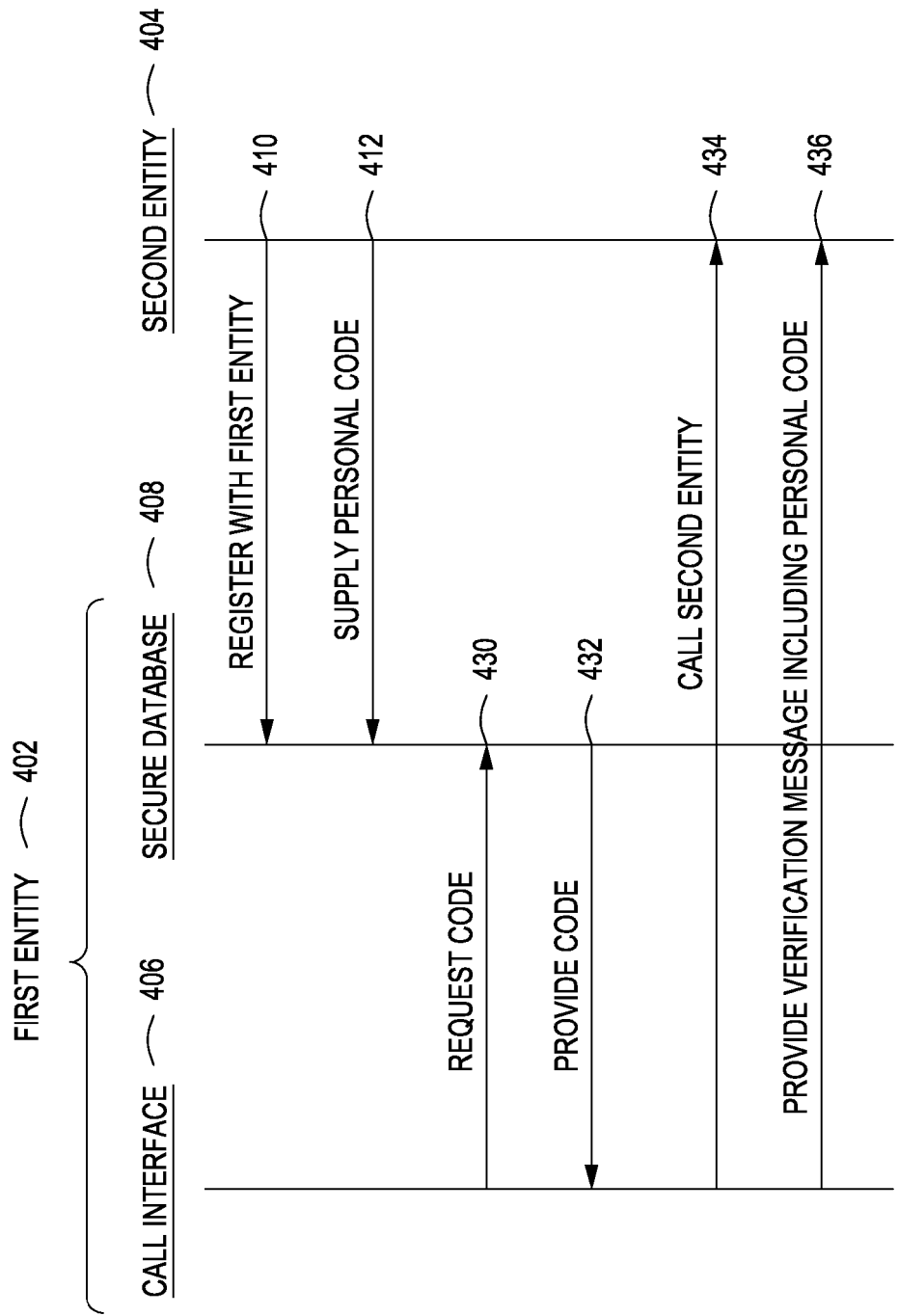
FIG. 4B depicts a signaling diagram of a method of validating an identity of a first entity to a second entity for an inbound call without the use of a third party trusted authority, according to one or more embodiments.

FIGS. 4A and 4B depict a signaling diagram of a method of validating an identity of a first entity to a second entity for an outbound call and inbound call, respectively, without the use of a third party trusted authority, according to one or more embodiments. Specifically, Bank A's customer, for example, may want to ensure that the entity they are calling is really Bank A. To accomplish this without the use of a third party authentication service such as the trusted authority discussed above, Bank A may maintain a secure database and caller interface that its customers may be able to register with. With respect to FIG. 4A, the first entity 402 may maintain a secure DB 408 and a call interface 406 that validates its identity to a second entity 404 (e.g., a customer). The second entity would contact the first entity and register themselves in the secure DB 408 at 410. At 412, the second entity would create, or be provided with, a personal code that would be stored in secure DB 408 in association with one or more of the second entity's contact numbers. In some embodiments, the secure database maintained by the first entity stores personal codes for a plurality of customers. In some embodiments, the second entity establishes or updates the personal code over a secure SSL connection over the Web.

When the second entity calls the first entity via call interface 406 at 414, the first entity would request the second entity's personal code from the secure DB at 416. In some embodiments, the second entity's personal code may be retrieved from the secure database using the second entity's contact number. In other embodiments, the second entity's personal code may be retrieved from the secure database using an account number and password supplied by the calling party. At 418, the personal code would be provided to the call interface 406 by the secure DB 408. At 420, after the call is established, the call interface 406 would play a verification message including the second entity's personal code to verify that the second entity called the first entity.

In embodiments associated with FIG. 4B, if the first entity desires to initiate a call to the second entity, the call interface 406 may first request the personal code of the second entity from secure DB 408 at 430. At 432, if the second entity is registered in secure DB 408, the secure DB will provide the call interface 406 with the second entity's personal code. The call interface 406 will then initiate a call with the second entity at 434. At 436, after the call is established, the call interface 406 will play/send a verification message including the second entity's personal code, or otherwise provide the personal code to the second entity, to verify the identity of the first entity. In some embodiments, the verification message would also include the name of the first entity.

The embodiments of the present invention may be embodied as methods, apparatus, electronic devices, and/or computer program products. Accordingly, the embodiments of the present invention may be embodied in hardware and/or in software (including firmware, resident software, micro-code, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 5:
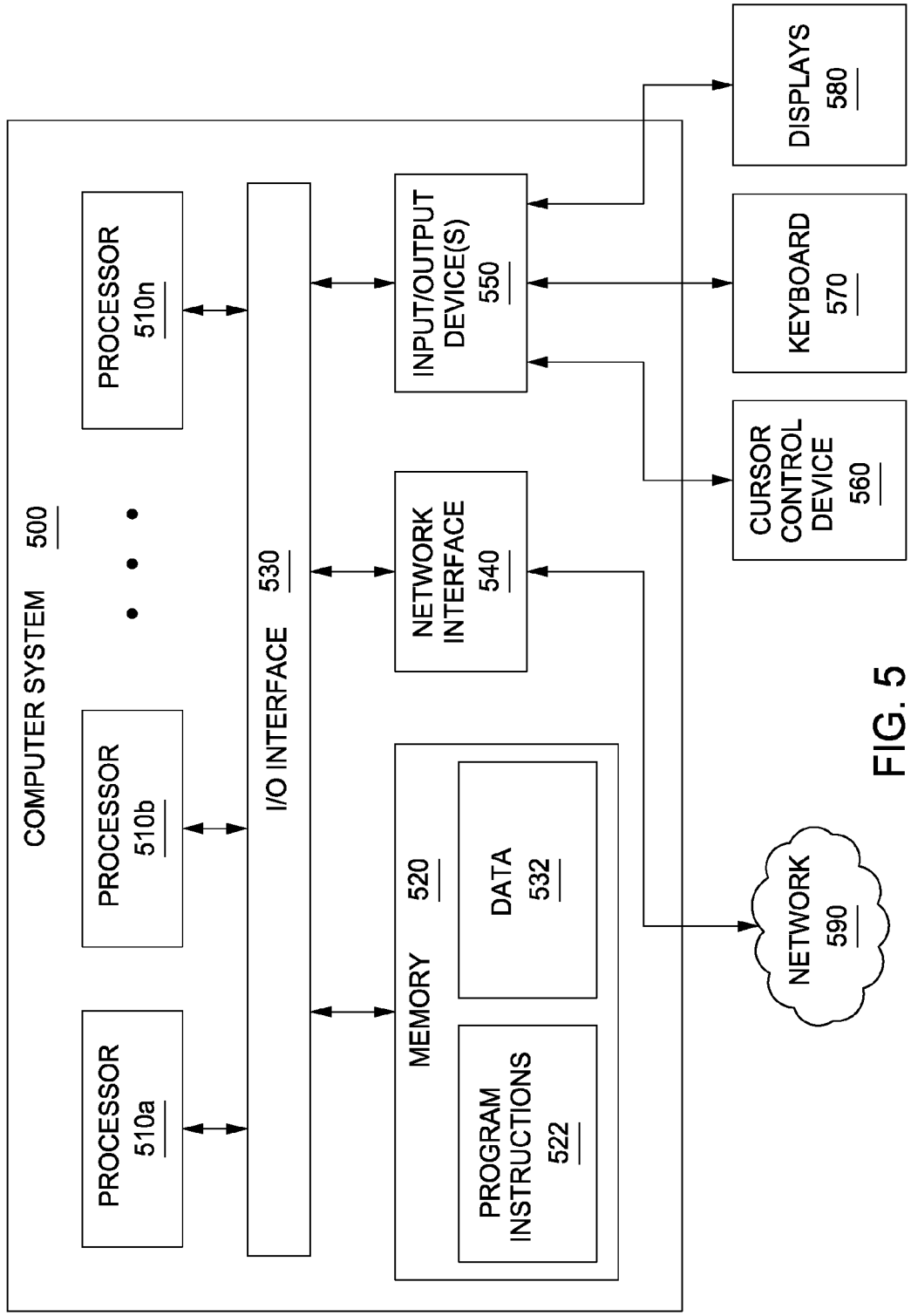
FIG. 5 depicts a computer system that can be utilized in various embodiments of the present invention, according to one or more embodiments.

FIG. 5 depicts a computer system 500 that can be utilized in various embodiments of the present invention to implement the computer and/or the display, according to one or more embodiments.

Various embodiments of method and apparatus for transitioning between a plurality of pages on a display device, as described herein, may be executed on one or more computer systems, which may interact with various other devices. One such computer system is computer system 500 illustrated by FIG. 5, which may in various embodiments implement any of the elements or functionality illustrated in FIGS. 1-4B. In various embodiments, computer system 500 may be configured to implement methods described above. The computer system 500 may be used to implement any other system, device, element, functionality or method of the above-described embodiments. In the illustrated embodiments, computer system 500 may be configured to implement methods 200 and 300 as processor-executable executable program instructions 522 (e.g., program instructions executable by processor(s) 510) in various embodiments.

In the illustrated embodiment, computer system 500 includes one or more processors 510a-510n coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In various embodiments, any of the components may be utilized by the system to receive user input described above. In various embodiments, a user interface may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, personal computer systems, mainframe computer systems, handheld computers, workstations, network computers, application servers, storage devices, a peripheral devices such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs). In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 550 may, in some embodiments, include one or more display terminals, keyboards, keypads, touchpads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the methods described above, such as the methods illustrated by the flowcharts of FIG. 2-4. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A method of providing trusted caller identification services between a first entity and a second entity comprising:
    (a) registering the first entity with a trust authority, wherein registering the first entity includes authenticating the identity of the first entity, and associating a unique code with a caller ID name (CNAM) of the first entity;
    (b) receiving an identifier included with a call request;
    (c) determining that the identifier is correlated with the unique code; and
    (d) providing to the second entity the CNAM together with an indication of validity.

2. The method of claim 1, wherein the unique code is different than a phone number, a CNAM, a network connection identifier, or device specific information associated with the first entity.

3. The method of claim 1, wherein the unique code can be derived from the identifier.

4. The method of claim 1, wherein the identifier is the same as the unique code.

5. The method of claim 4, wherein the unique code is included in a certificate supplied to the first entity by the trust authority, and wherein the certificate is stored on a device associated with the first entity.

6. The method of claim 1, wherein the unique code is a user name and password.

7. The method of claim 1, wherein providing an indication of validity includes at least one of (1) augmenting the CNAM with a reserve character, (2) playing to the second entity a reserved audio tone, (3) sending a message to the second entity using another communication means, (4) playing to the second entity an interactive voice response message, or (5) causing a device associated with the second entity to play a special ring tone.

8. The method of claim 1, wherein the first entity's contact number is used to lookup the first entity's CNAM to further verify the validity of the first entity.

9. The method of claim 1, further comprising:
    (e) receiving a second call request from a device associated with a third entity to establish a call with the second entity, wherein the third entity is not registered with the trust authority; and
    (f) providing to the second entity the CNAM together without an indication of validity.

10. The method of claim 1, wherein the trust authority is maintained by a telephony provider that establishes the call between the first entity and the second entity.

11. The method of claim 1, wherein the trust authority is maintained by an entity that is not a telephony provider that establishes the call between the first entity and the second entity.

12. A method of providing trusted caller identification services between a first entity and a second entity comprising:
    (a) registering the second entity in a database maintained by the first entity, wherein registering includes associating a personal code in a secure database with one or more contact numbers associated with the second entity;
    (b) receiving a call from the second entity;
    (c) retrieving, from the database, the second entity's personal code; and
    (d) after the call is established, providing a verification message including the second entity's personal code to verify that the second entity called the first entity.

13. The method of claim 12, wherein the second entity's personal code is retrieved from the database using the second entity's contact number.

14. The method of claim 12, wherein the calling party's personal code is retrieved from the database using an account number and password supplied by the calling party.

15. A method of providing trusted caller identification services between a first entity and a second entity comprising:
    (a) registering the second entity in a database maintained by the first entity, wherein registering includes associating a personal code in a secure database with one or more contact numbers associated with the second entity;
    (b) retrieving, from the database, the second entity's personal code; and
    (c) calling the second entity; and
    (d) after the call is established, providing a verification message including the second entity's personal code to verify the identity of the first entity.

16. The method of claim 15, wherein the second entity's personal code is retrieved from the database using the second entity's contact number.

17. The method of claim 15, wherein the second entity establishes or updates the personal code over a secure SSL connection.

18. The method of claim 15, wherein the second entity establishes or updates the personal code over the Web.

19. The method of claim 15, wherein the database maintained by the first entity stores personal codes for a plurality of customers.

* * * * *